United States Patent [19]

Moench et al.

[11] Patent Number: 5,292,800
[45] Date of Patent: Mar. 8, 1994

[54] WATER-IN-OIL POLYMER EMULSIONS

[75] Inventors: Dietmar Moench, Weinheim; Heinrich Hartmann, Limburgerhof; Hans-Ulrich Wekel, Ellerstadt, all, Fed. Rep. of Germany

[73] Assignee: BASF Aktiengesellschaft, Ludwigshafen, Fed. Rep. of Germany

[21] Appl. No.: 929,025

[22] Filed: Aug. 13, 1992

[30] Foreign Application Priority Data

Aug. 21, 1991 [DE] Fed. Rep. of Germany ....... 4127571
Nov. 26, 1991 [DE] Fed. Rep. of Germany ....... 4138791

[51] Int. Cl.$^5$ ................................ C08K 5/11
[52] U.S. Cl. ..................... 524/801; 524/313; 524/314; 524/315; 524/318; 524/762
[58] Field of Search ............... 524/762, 801, 313, 314, 524/315, 318

[56] References Cited

U.S. PATENT DOCUMENTS 3,284,393 11/1966 Vanderhoff et al. .
3,624,019 12/1983 Anderson et al. .
4,059,552 11/1977 Zweigle et al. .
4,419,344 12/1983 Strasilla et al. .................... 526/307
4,824,894 4/1989 Scanee et al. ....................... 524/314

FOREIGN PATENT DOCUMENTS 0045720 9/1986 European Pat. Off. .
3302069 8/1983 Fed. Rep. of Germany .
3524950 1/1987 Fed. Rep. of Germany .
1562417 3/1980 United Kingdom .

*Primary Examiner*—Joseph L. Schofer
*Assistant Examiner*—Jeffrey T. Smith
*Attorney, Agent, or Firm*—Oblon, Spivak, McClelland, Maier & Neustadt

[57] ABSTRACT

Water-in-oil emulsions of water-soluble or water-swellable polymers, in which the oil phase of the emulsion consists of not less than 50% by weight of an oil of vegetable or animal origin, contain, as water-in-oil emulsifiers, compounds which are obtainable by (A) reacting a $C_{10}$–$C_{22}$-fatty alcohol with epichlorohydrin in a molar ratio of from 1:0.5 to 1:1.5 to give a glycidyl ether, (B) reacting the glycidyl ether with (1) a saturated $C_2$–$C_6$-alcohol containing from 2 to 6 OH groups or (2) the monoether thereof with a $C_{10}$–$C_{22}$-fatty alcohol, in a molar ratio of glycidyl ether to (1) or (2) of from 1:0.5 to 1:6, in the presence of an acid or base and (C) alkoxylating the reaction product from (B) with one or more $C_2$–$C_4$-alkylene oxides in a molar ratio of from 1:1 to 1:6, if necessary, from 5 to 95% by weight of the stated water-in-oil emulsifier being replaced with other water-in-oil emulsifiers.

2 Claims, No Drawings

WATER-IN-OIL POLYMER EMULSIONS

The present invention relates to water-in-oil polymer emulsions in which the oil phase consists of not less than 50% of oils of animal or vegetable origin, and which contain alkoxylated reaction products of glycidyl ethers with polyhydric alcohols as water-in-oil emulsifiers.

Water-in-oil polymer emulsions of water-soluble polymers are disclosed in U.S. Pat. No. 3,284,393. U.S. Pat. No. 4,059,552 describes water-swellable polymers which are prepared by the emulsion polymerization process and have a particle size of less than 4 μm. The oil phase of the water-in-oil polymer emulsion consists of aliphatic, aromatic or chlorinated hydrocarbons and of mixtures of different virtually water-immiscible hydrocarbons. To transfer the polymers of a water-in-oil polymer emulsion to the aqueous phase, according to U.S. Pat. No. 3,624,019 the water-in-oil polymer emulsions are brought into contact with water in the presence of wetting agents. The oil phase is thus emulsified in the added water.

GB-B-1 562 417 relates to the preparation of water-in-oil emulsions of polyacrylamides, which emulsions are stable to sedimentation. The water-in-oil emulsifiers used are alkoxylated reaction products of glycidyl ethers with polyhydric alcohols.

EP-B-0 045 720 discloses, inter alia, water-in-oil emulsions of polymers of water-soluble monoethylenically unsaturated cationic monomers. According to the description, oils of animal and vegetable origin may also form the oil phase of the water-in-oil polymer emulsion, but a branched paraffin is used as the oil phase in all Examples.

DE-B-3 302 069 discloses polymer- and surfactant-containing preparations which are in the form of a water-in-oil polymer emulsion and in which the oil phase of the emulsion may also consist of vegetable and animal oils, i.e. essentially triglycerides. In the Examples of this publication, however, exclusively hydrocarbons are used as the oil phase.

DE-B-3 524 950 relates to environment-friendly flocculant organosols which contain biodegradable aliphatic dicarboxylic esters, for example bis-(2-ethylhexyl) adipate, as the oil phase. Products of this type are prepared economically and with constant quality in large-scale industrial syntheses. They are furthermore readily biodegradable. According to this publication, the use of animal or vegetable oils as the oil phase of water-in-oil polymer emulsions is disadvantageous because the natural products are impure and vary in their composition, which has an adverse effect on the quality of the organosols and on their use as flocculants. As will be shown below with reference to Comparative Examples, the use of oils of vegetable origin as the oil phase in the preparation of water-in-oil polymer emulsions leads to technical difficulties because said emulsions have high coagulum contents or are extremely difficult to filter.

It is an object of the present invention to provide water-in-oil polymer emulsions which are coagulum-free or contain only little coagulum and are readily processible and whose oil phase is biodegradable.

We have found that this object is achieved, according to the invention, by water-in-oil polymer emulsions which contain water-soluble or water-swellable polymers finely distributed in a continuous, virtually water-immiscible organic phase, a water-in-oil emulsifier and, if required, wetting agents, if the continuous organic phase consists of not less than 50% by weight of an oil of vegetable or animal origin and contains, as a water-in-oil emulsifier, a compound which is obtainable by (A) reacting a $C_{10}$–$C_{22}$-fatty alcohol with epichlorohydrin in a molar ratio of from 1:0.5 to 1:1.5 to give a glycidyl ether, (B) reacting the glycidyl ether with (1) a saturated $C_2$–$C_6$-alcohol containing from 2 to 6 OH groups or (2) the monoether thereof with a $C_{10}$–$C_{22}$-fatty alcohol, in a molar ratio of glycidyl ether to (1) or (2) of from 1:0.5 to 1:6, in the presence of an acid or base and (C) alkoxylating the reaction product from (B) with one or more $C_2$–$C_4$-alkylene oxides in a molar ratio of from 1:1 to 1:6, if necessary from 5 to 95% by weight of the stated water-in-oil emulsifier being replaced with other water-in-oil emulsifiers. The other water-in-oil emulsifiers are referred to below as water-in-oil emulsifiers II.

The present invention furthermore relates to a process for the preparation of the water-in-oil polymer emulsions described above, in which water-soluble monoethylenically unsaturated monomers, alone or together with crosslinking agents and/or, if required, water-insoluble monoethylenically unsaturated monomers, are emulsified with water-in-oil emulsifiers which are obtainable by (A) reacting a $C_{10}$–$C_{22}$-fatty alcohol with epichlorohydrin in a molar ratio of from 1:0.5 to 1:1.5 to give a glycidyl ether, (B) reacting the glycidyl ether with (1) a saturated $C_2$–$C_6$-alcohol containing from 2 to 6 OH groups or (2) the monoether thereof with a $C_{10}$–$C_{22}$-fatty alcohol, in a molar ratio of glycidyl ether to (1) or (2) of from 1:0.5 to 1:6, in the presence of an acid or base and (C) alkoxylating the reaction product from (B) with one or more $C_2$–$C_4$-alkylene oxides in a molar ratio of from 1:1 to 1:6, if necessary, from 5 to 95% by weight of the stated water-in-oil emulsifer being replaced with other water-in-oil emulsifiers, in an organic phase which consists of not less than 50% by weight of an oil of vegetable or animal origin and the monomers of the emulsion are polymerized in the presence of initiators and, if required, wetting agents.

The oil phase of the water-in-oil polymer emulsions consists of not less than 50%, preferably 100%, of an oil of vegetable or animal origin. These oils may be denatured or refined products. The main components of the natural oils are primarily triglycerides whose carboxylic acid moiety is derived from monoethylenically or polyethylenically unsaturated and from saturated $C_{10}$–$C_{30}$-fatty acids. Examples of suitable vegetable oils are olive oil, safflower oil, soybean oil, peanut oil, cotton oil, rapeseed oil, sunflower oil, coffee oil, linseed oil and mixtures thereof. Suitable animal oils are fish oils, for example sardine oil, herring oil, salmon oil, shark liver oil and whale oil. In addition to the fish oils, tallow oil, bone oil, neatsfoot oil and lard oil are suitable as the oil phase. Both the pure oils and mixtures of any oils may form the oil phase of the water-in-oil polymer emulsions. Preferred oils are sunflower oil, rapeseed oil, whale oil and tallow oil.

The amount of oils used, based on the total emulsion, is from 20 to 70, preferably from 30 to 60, % by weight. Not less than 50% by weight of the oil of the virtually water-immiscible organic phase of the water-in-oil polymer emulsion consists of vegetable and/or animal oils. The oil phase of said emulsions consists particularly preferably of 100% of these oils. However, the natural oils can be used with any virtually water-immiscible liquids employed to date for the preparation of water-in-oil polymer emulsions. Suitable components for mixing with the naturally occurring oils are mainly virtually water-immiscible liquids which are biodegradable, for example the aliphatic dicarboxylic esters stated in DE-B-3 524 950. In order to reduce the viscosity of the water-in-oil polymer emulsions, it may be advantageous if the oil phase contains up to 15% by weight of a conventionally used hydrocarbon, for example hexane, cyclohexane, heptane, n-octane or isooctane. However, the oil phase preferably consists of a vegetable or animal oil or of a mixture of such oils.

The water-in-oil polymer emulsions contain finely divided water-soluble or water-swellable polymers. The polymers are prepared by polymerizing water-soluble monoethylenically unsaturated monomers, alone or together with crosslinking agents, in the aqueous phase of a water-in-oil emulsion in the presence of emulsifiers and, if required, wetting agents and conventional polymerization initiators. Said monomers may be copolymerized together with water-insoluble monoethylenically unsaturated monomers, e.g. vinyl acetate, as a rule the water-insoluble monomers being used only in an amount such that water-soluble polymers are still formed. If the water-soluble monoethylenically unsaturated monomers are copolymerized together with crosslinking agents, water-insoluble monoethylenically unsaturated monomers may additionally be used. Such polymers and the preparation of polymers by the water-in-oil polymerization method are known.

For further illustration, water-soluble monoethylenically unsaturated compounds are mentioned below merely by way of example, i.e. monoethylenically unsaturated carboxylic acids, such as acrylic acid, methacrylic acid, maleic acid and itaconic acid, salts of the stated carboxylic acids, for example the sodium, potassium or ammonium salts, esters of acrylic acid and methacrylic acid with amino alcohols, for example dimethylaminoethyl acrylate in protonated or quaternized form, e.g. dimethylaminoethyl acrylate hydrochloride, dimethylaminoethyl acrylate hydrosulfate, dimethylaminoethyl acrylate methochloride, dimethylaminoethyl acrylate methosulfate, dimethylaminoethyl methacrylate hydrochloride, dimethylaminoethyl methacrylate hydrosulfate, dimethylaminoethyl methacrylate methochloride, dimethylaminoethyl methacrylate methosulfate, acrylamide, methacrylamide, N-alkylated (meth)acrylamides, methacrylamidopropyltrimethylammonium chloride, acrylamidopropyltrimethylammonium chloride, methacrylamidopropyltrimethylammonium methylsulfate, acrylamidopropyltrimethylammonium ethylsulfate, acrylamido- and methacrylamidoalkanesulfonic acids and salts thereof, such as 2-acrylamido-2-methylpropanesulfonic acid, hydroxyalkyl acrylates and hydroxyalkyl methacrylates, vinylsulfonic acid, vinylphosphonic acid, N-vinylamides, for example N-vinylformamide, N-vinylacetamide, N-vinyl-N-methylacetamide and N-vinyl-N-methylformamide, diallyldimethylammonium chloride, N-vinylpyrrolidone, N-vinylimidazole, N-vinylimidazoline, 2-methyl-1-vinylimidazoline, 2-sulfoethyl methacrylate, styrenephosphonic acid and styrenesulfonic acid.

Further suitable water-soluble monomers are N-methylolacrylamide, N-methylolmethacrylamide and the N-methylol(meth)acrylamides partially or completely etherified with mono-$C_1$-$C_4$-alcohols. The water-soluble monomers can be polymerized either alone or as a mixture with one another to give water-soluble polymers. They can be copolymerized with one another in any ratio.

Water-swellable polymers are obtainable by polymerizing water-soluble monoethylenically unsaturated monomers together with crosslinking agents. The amounts of crosslinking agents used here are dependent on the type of crosslinking agent and are from 10 ppm to 10% by weight, based on the monomers used. The amounts of crosslinking agents are preferably from 0.001 to 1% by weight. The crosslinking agents contain two or more nonconjugated, ethylenically unsaturated double bonds. Examples of suitable crosslinking agents are N,N'-methylenebisacrylamide, polyethylene glycol diacrylates and polyethylene glycol dimethacrylates, each of which is derived from a polyethylene glycol having a molecular weight of from 126 to 8,500, trimethylolpropane triacrylate, trimethylolpropane trimethacrylate, ethylene glycol diacrylate, propylene glycol diacrylate, butanediol diacrylate, hexanediol diacrylate, hexanediol dimethacrylate, diacrylates and dimethacrylates of block copolymers of ethylene oxide and propylene oxide, adducts of ethylene oxide and/or propylene oxide with trimethylolpropane, which adducts are diesterified or triesterified with acrylic acid or methacrylic acid, polyhydric alcohols, such as glycerol or pentaerythritol, which are diesterified or polyesterified with acrylic acid or methacrylic acid, triallylamine, tetraallylethylenediamine, divinylbenzene, diallyl phthalate, polyethylene glycol divinyl ether, trimethylolpropane diallyl ether, butanediol divinyl ether, pentaerythritol triallyl ether and/or divinylethylene urea and/or triallylmonoalkylammonium salts, e.g. triallylmethylammonium chloride. Water-soluble crosslinking agents are preferably used, for example N,N'-methylenebisacrylamide, polyethylene glycol diacrylates, polyethylene glycol dimethacrylates, pentaerythritol triallyl ether and/or divinylurea.

Water-in-oil polymer emulsions contain alkoxylated reaction products of glycidyl ethers with polyhydric alcohols as water-in-oil emulsifiers, said alcohols being an essential component. Such emulsifiers can be prepared, for example, by reacting (A) a $C_{10}$-$C_{22}$-alcohol with epichlorohydrin in a molar ratio of from 1:0.5 to 1:1.5 to give a glycidyl ether, (B) reacting the glycidyl ether with (1) a saturated $C_2$-$C_6$-alcohol containing from 2 to 6 OH groups or (2) the monoether with a $C_{10}$-$C_{22}$-fatty alcohol, in a molar ratio of glycidyl ether to (1) or (2) of from 1:0.5 to 1:6 in the presence of an acid or base and (C) alkoxylating the reaction product from (B) with one or more $C_2$-$C_4$-alkylene oxides in a molar ratio of from 1:1 to 1:6.

Emulsifiers of this type are disclosed, for example, in the abovementioned GB-B-1 562 417. For the preparation of these emulsifiers, a $C_{10}$-$C_{22}$-fatty alcohol is reacted with an epichlorohydrin in the stated molar ratio in process stage (A) to give a glycidyl ether. Examples of suitable fatty alcohols are oleyl alcohol, stearyl alcohol, cetyl alcohol, myristyl alcohol, lauryl alcohol, allow fatty alcohol and the long-chain alcohols of 10 to 22 carbon atoms obtainable by the oxo process.

In process stage (B), the glycidyl ether obtained in (A) is reacted with a saturated $C_2$–$C_6$-alcohol containing from 2 to 6 OH groups. Examples of suitable polyhydric alcohols of this type are ethylene glycol, diethylene glycol, dipropylene glycol, butane-1,4-diol, butane-1,2,4-triol, glycerol, trimethylolpropane, sorbitol, neopentylglycol and pentaerythritol. The stated polyhydric alcohols may also have an ether group which is derived from a $C_{10}$–$C_{22}$-fatty alcohol. Suitable fatty alcohols of this type have already been mentioned above under (A) Suitable monoethers of saturated $C_2$–$C_6$-alcohols containing from 2 to 6 OH groups are, for example, 1-oleyloxypropane-2,3-diol and stearyloxypropane-2,3-diol. The glycidyl ethers are reacted with the two classes of compounds stated under (B), either alone or as a mixture having a ratio of glycidyl ether to polyhydric alcohol or monoether of the polyhydric alcohol of from 1:0.5 to 1:6, in the presence of an acid or base. The reaction products thus obtained are then alkoxylated in the reaction stage (C). Suitable alkylene oxides for this purpose are ethylene oxide, propylene oxide and butylene oxides. Ethylene oxide is preferably used. It is possible to use mixtures of ethylene oxide and propylene oxide, ethylene oxide and butylene oxide or ethylene oxide, propylene oxide and butylene oxide for alkoxylating the reaction products (B). From 1 to 6 mol of alkylene oxides are used per mol of the compound according to (B). The amount of the water-in-oil emulsifiers described above which is used is from 1 to 40, preferably from 10 to 25, % by weight, based on the total emulsion.

Suitable water-in-oil emulsifiers II having HLB values of from 2 to 10, preferably from 3 to 7, are, for example, fatty esters of mono-, di- and polyglycerols, such as monooleate, dioleate, monostearate, distearate and palmitate stearate. These esters are obtainable, for example, by esterifying mono-, di- and polyglycerols or mixtures of the stated polyhydric alcohols with long-chain fatty acids, for example with oleic acid, stearic acid or plamitic acid. Other suitable water-in-oil emulsifiers II are sorbitan fatty esters, such as sorbitan monooleate, sorbitan dioleate, sorbitan trioleate, sorbitan monostearate and sorbitan tristearate. Further suitable water-in-oil emulsifiers II are fatty esters of mannitol, such as mannityl monolaurate or mannityl monopalmitate, fatty esters pentaerythritol, such as pentaerythrityl monomyristate, pentaerythrityl monopalmitate or pentaerythrityl dipalmitate, polyethylene glycol sorbitan fatty esters, in particular the monooleates, polyethylene glycol mannitol fatty esters, in particular monooleates and trioleates, glucose fatty esters, such as glucose monooleate and glucose monostearate, trimethylolpropane distearate, reaction products of isopropylamide with oleic acid, glycerol sorbitan fatty esters, ethoxylated alkylamines, hexadecyl sodium phthalate and decyl sodium phthalate. Other suitable water-in-oil emulsifiers II are commercial polymeric emulsifiers, for example the ICI products EL 1429 D 477 and E 475.

The water-in-oil polymer emulsions may furthermore contain up to 10% by weight, based on the total emulsion, of a wetting agent having an HLB value of more than 10 (for the definition of the HLB value, see W.C. Griffin, Journal of the Society of the Cosmetic Chemist, 1 (1950), 311. Examples of suitable wetting agents having an HLB value greater than 10 are ethoxylared alkylphenols, dialkyl esters of sodium sulfosuccinates in which the alkyl group is of not less than 3 carbon atoms, soaps which are derived from fatty acids of 10 to 22 carbon atoms, and alkali metal salts of alkyl- or alkenyl-sulfates of 10 to 26 carbon atoms. Ethoxylated fatty alcohols and ethoxylated amines are also suitable. If the wetting agents are used in the polymerization itself, particularly finely divided water-in-oil polymer emulsions may be obtained.

The polymerization of the monomers is carried out in the presence of conventional polymerization initiators. Water-soluble compounds, such as potassium peroxodisulfate, 2,2'-azobis-(2-amidinopropane) dihydrochloride, 4,4'-azobis-(4-cyanopentanoic acid) or redox systems, e.g. ammonium persulfate/ferric sulfate, may be used. Oil-soluble initiators, for example peroxides (dibenzoyl peroxide, dilauryl peroxide or tert-butyl perpivalate) or azo compounds (azobisisobutyronitrile, dimethyl 2,2'-azobisisobutyrate or 2,2'-azobis-(4-methoxy-2,4-dimethylvaleronitrile)), are preferably used.

The polymerization temperature depends on the kinetics of decomposition of the initiator used and may be from 5° to 100° C. To reduce the content of residual monomers, it is also possible to begin with one initiator and then to end the polymerization with a second initiator, if necessary at a higher temperature. The amounts of initiators used are as a rule from 0.01 to 1, preferably from 0.02 to 0.5, % by weight, based on the monomers.

The novel water-in-oil polymer emulsions are, as a rule, self-inverting, i.e. a phase inversion occurs when the emulsion is poured into water and the polymer present in the emulsion dissolves in water. The phase inversion can, however, be accelerated by adding wetting agents. The wetting agents may be added to the emulsion or to the water into which the emulsion is introduced. Preferably used wetting agents for inverting the water-in-oil emulsions are ethoxylated nonylphenol having a degree of ethoxylation of from 5 to 20 or ethoxylated and/or propoxylated fatty alcohols of 10 to 22 carbon atoms, having a degree of alkoxylation of from 5 t 5 t. 20 or ethr-in-oil polymer emulsions described above have only relatively small contents of coagulum, can easily be filtered and are readily processible. The polymers have Fikentscher K values of not less than 100, preferably from 140 to 300. The water-in-oil polymer emulsions prepared by the novel process can be used for a very wide range of applications, for example as retention agents and drainage aids in the production of paper, board and cardboard, and flocculants and dewatering agents for sewage sludge, as flocculants in the preparation of drinking water, as a liquefier for the suspension of drilling muds, for example in mineral oil production, as a thickener in textile printing and as a cement additive.

In the Examples which follow, parts and percentages are by weight, unless stated otherwise. The K value of the polymers was determined according to H. Fikentscher, Cellulosechemie, 13 (1932), 58–64 and 71–71, in 5% strength by weight sodium chloride solution at 25° C. and at a polymer concentration of 0.1% by weight and a pH of 7.

The viscosity of the water-in-oil polymer emulsions was measured in a rotational viscometer (Rotovisco RV 20 from Haake, MVDIN measuring system) at 25° C. and at a shear gradient of 100 s$^{-1}$. The following emulsifiers were used:

Emulsifier A (=water-in-oil emulsifier I) was prepared by (A) reacting oleyl alcohol with epichlorohydrin in a molar ratio of 1:1 to give oleyl glycidyl ether, (B) reacting the latter with glycerol in a molar ratio of 1:1 in the presence of $BF_3$/phosphoric acid at 80° C. and removing the catalyst with the aid of a basic ion exchanger and (C) ethoxylating the reaction product from (B) with 2 mol of ethylene oxide.

Emulsifier B: Commercial sorbitan monooleate.
Emulsifier C: Commercial sorbitan monostearate.

Water-in-oil emulsifiers II

Emulsifier II/1 is prepared according to EP-A 451 461 by esterification of polyglycerol with 2 mol of oleic acid.

Emulsifier II/2: reaction product of polyglycerol with 2 mol of stearic acid.

Emulsifier II/3: commercial sorbitan monooleate.

Emulsifier II/4: ICI polymer emulsifer EL 1429.

General Preparation Method for the Water-in-Oil Polymer Emulsions

A monomer emulsion which is prepared by mixing the aqueous monomer phase and the oil phase with stirring and which has been substantially freed from dissolved oxygen by flushing with nitrogen is heated to the reaction temperature stated in each of the Examples. The initiator is then added. During the polymerization, the bath temperature is controlled so that the temperature of the emulsion remains constant. After the end of the polymerization, the water-in-oil polymer emulsion is filtered through a Perlon filter having the mesh size stated in each of the Examples. The filtered coagulum is washed with cyclohexane and then dried and weighed.

About 2 g of the polymer of the water-in-oil polymer emulsions are isolated by precipitation with a mixture of methanol and acetone in a weight ratio of 1:1 and dried in a drying oven under reduced pressure at 70° C. until the weight remains constant.

EXAMPLE 1

250 g of rapeseed oil (fully refined product),
110 g of emulsifier A,
160 g of a 50% strength aqueous acrylamide solution and
0.1 g of a 40% strength aqueous sodium diethylenetriaminepentaacetate solution were introduced in succession into a 2 l flask provided with a stirrer, a thermometer and a gas inlet tube, and the mixture was stirred at a speed of 200 rpm while passing in nitrogen for 30 minutes at 25° C. Thereafter, 0.1 g of dimethyl 2,2'-azobisisobutyrate, dissolved in 1 g of acetone, was added and the reaction mixture was heated to 55° C. During the polymerization, the bath temperature was controlled so that the temperature of the reaction mixture remained constant. After about 4 hours, the polymerization is complete. The emulsion was then filtered through a Perlon filter having a mesh size of 250 µm. The polymer had a K value of 178 and the viscosity of the water-in-oil polymer emulsion was 260 mPa.s. 0.9% of coagulum was filtered off.

When 2 g of water-in-oil polymer emulsion were added to 98 g of distilled water while stirring rapidly with a magnetic stirrer, a virtually homogeneous, milky viscous solution was obtained after about 15 minutes. This inversion process and dissolution of the polyacrylamide in water could be accelerated if 0.6 g of a reaction product of myristyl alcohol with 7 mol of ethylene oxide and 4 mol of propylene oxide, as a wetting agent, were stirred into 100 g of emulsion. A virtually homogeneous, milky viscous solution was then obtained after only about 8 minutes.

EXAMPLE 2

Example 1 was repeated, except that 300 g of a 50% strength aqueous acrylamide solution, 220 g of rapeseed oil (fully refined product) and 80 g of emulsifier A were used. The resulting water-in-oil polymer emulsion had a viscosity of 3,500 mPa.s. The K value of the polymer was 208. 0.09% of coagulum was filtered off.

EXAMPLE 3

Example 1 was repeated, except that 240 g of a 50% strength aqueous acrylamide solution, 275 g of sunflower oil (fully refined product) and 80 g of emulsifier A were used, instead of the amounts and substances stated in Example 1. The viscosity of the water-in-oil polymer emulsion was 1,130 mPa.s. The polymer had a K value of 195. 0.85% of coagulum was filtered off.

COMPARATIVE EXAMPLE 1

Example 1 was repeated, except that 250 g of a 50% strength aqueous acrylamide solution, 250 g of rapeseed oil (fully refined product) and 80 g of emulsifier B were used. A specky non-filterable water-in-oil polymer emulsion was formed.

EXAMPLE 4

130 g of rapeseed oil (fully refined product) and
60 g of emulsifier A were initially taken as the oil phase in a 2 l flask provided with a stirrer, a thermometer and a gas inlet tube. Thereafter, a mixture of 140 g of a 50% strength aqueous acrylamide solution,
48 g of an 80% strength dimethylaminoethyl acrylate methochloride solution and
0.1 g of a 40% strength sodium diethylenetriaminepentaacetate solution was added as the aqueous phase (the pH was brought to 4.0 by adding a few drops of 10% strength hydrochloric acid), and stirring was carried out at a speed of 200 rpm while passing in nitrogen for 30 minutes at 25° C. 0.1 g of dimethyl 2,2'-azobisisobutyrate in 1 g of acetone was then added as the initiator, and the reaction mixture was heated to 55° C. During polymerization, the bath temperature was controlled so that the temperature of the reaction mixture remained constant. The polymerization was complete after 4 hours. The emulsion was then filtered through a Perlon filter having a mesh size of 250 µm. The coagulum content was 0.09%, based on the total emulsion. The water-in-oil polymer emulsion had a viscosity of 700 mPa.s. The K value of the polymer was 197.

When 2 g of the water-in-oil polymer emulsion described above were added to 98 g of distilled water while stirring rapidly with a magnetic stirrer, a virtually homogeneous, milky viscous solution was obtained after about 17 minutes.

This inversion process and the dissolution of the copolymer could be accelerated if 0.4 g of a reaction product of myristyl alcohol with 7 mol of ethylene oxide and 4 mol of propylene oxide were stirred into 100 g of emulsion, and the procedure described above were carried out with this wetting agent-containing water-in-oil polymer emulsion. A virtually homogeneous, milky, viscous solution was then obtained after only about 8 minutes.

EXAMPLES 5 TO 14

Example 4 was repeated, in each case with the changes shown in Table 1. The results obtained are likewise shown in Table 1.

TABLE 1

| Example | $M_1$ [g] | $M_2$ [g] | Oil [g] | Emulsifier [g] | Initiator | T [°C.] | Coagulum [%] | K value | Viscosity [mPa·s] |
|---|---|---|---|---|---|---|---|---|---|
| | | | | Emulsifier A | | | | | |
| 5 | 140 | 48 | 130[1] | 45 | a | 55 | 0.41 | 211 | 1290 |
| 6 | 140 | 48 | 130[1] | 30 | a | 55 | n.d. | 233 | 24000 |
| 7 | 140 | 48 | 130[1] | 45 | b | 30 | 0.01 | 232 | 1190 |
| 8 | 140 | 48 | 130[2] | 45 | a | 55 | 0.23 | 204 | 1250 |
| 9 | 140 | 48 | 130[3] | 45 | a | 55 | 0.5 | 199 | 1145 |
| 10 | 140 | 48 | 130[4] | 45 | a | 55 | 0.4 | 208 | 930 |
| 11 | 140 | 48 | 180[1] | 60 | a | 55 | 0.11 | 205 | 640 |
| 12 | 100 | 88 | 150[1] | 60 | a | 55 | 0.08 | 177 | 860 |
| 13 | 120 | 68 | 150[1] | 60 | a | 55 | 0.08 | 192 | 690 |
| 14 | 160 | 28 | 150[1] | 60 | a | 55 | 0.22 | 206 | 920 |
| Comparative Example | | | | Emulsifier B | | | | | |
| 2 | | | 130[1] | 45 | a | 55 | [5] | n.d. | n.d. |
| 3 | | | 130[1] | 60 | a | 55 | [5] | n.d. | n.d. |
| 4 | | | 130[1] | 80 | a | 55 | 1.5 | 173 | n.d. |
| 5 | | | 180[1] | 60 | a | 55 | [5] | n.d. | n.d. |
| | | | | Emulsifier C | | | | | |
| 6 | | | 130[1] | 80 | a | 55 | [5] | n.d. | n.d. |

$M_1$: 50% strength aqueous acrylamide solution
$M_2$: 80% strength aqueous dimethylaminoethyl acrylate methochloride solution
T: Polymerization temperature
a: Dimethyl 2,2'-azobisisobutyrate
b: 2,2'-Azobis-(4-methoxy-2,4-dimethylvaleronitrile)
[1] Rapeseed oil (fully refined product)
[2] Sunflower oil (fully refined product)
[3] Olive oil (fully refined product)
[4] Safflower oil (fully refined product)
[5]: Non-filterable (specky)
n.d.: not determinable

EXAMPLE 15

190 g of rapeseed oil and
60 g of emulsifier A
were initially taken as the oil phase in a 2 l flask provided with a stirrer, a thermometer and a gas inlet tube. For the preparation of the aqueous phase, 125 g of a 50% strength aqueous acrylamide solution,
27 g of acrylic acid,
0.02 g of formic acid as a regulator and
0.1 g of a 40% strength aqueous solution of sodium diethylenetriaminepentaacetate were mixed, and 59 g of a 25% strength aqueous sodium hydroxide solution were carefully added. The pH of the aqueous phase was then 7.0. The aqueous phase was then added to the oil phase, and the mixture was stirred at a speed of 200 rpm, nitrogen being passed through the mixture at 25° C. for 30 minutes. Thereafter, 0.1 g of dimethyl 2,2'-azobisisobutyrate, dissolved in 1 g of acetone, was added as an initiator, and the reaction mixture was heated to 55° C. The polymerization lasted about 4 hours. The resulting water-in-oil polymer emulsion was then filtered through a Perlon filter having a mesh size of 250 μm. The amount of coagulum was 0.25%, based on the total of the emulsion. The copolymer had a K value of 226. The viscosity of the water-in-oil polymer emulsion was 600 mPa.s.

When 2 g of the emulsion described above was added to 98 g of distilled water while stirring rapidly with a magnetic stirrer, a virtually homogeneous, milky viscous solution was obtained after about 20 minutes. The dissolution of the polymer in water could be accelerated, however, when 0.4 g of a reaction product of 1 mol of myristyl alcohol with 7 mol of ethylene oxide and 4 mol of propylene oxide was stirred into 100 g of the water-in-oil polymer emulsion described above. A virtually homogeneous, milky viscous solution was then obtained after only about 10 minutes.

EXAMPLES 16 TO 20

Example 15 was repeated with the changes shown in Table 2. The results obtained are likewise shown in Table 2.

TABLE 2

| Example | $M_1$ [g] | $M_2$ [g] | NaOH [g] | Oil [g] | Emulsifier [g] | Initiator | T [°C.] | Coagulum [%] | K value | Viscosity [mPa·s] |
|---|---|---|---|---|---|---|---|---|---|---|
| | | | | | Emulsifier A | | | | | |
| | | | | with 200 ppm of formic acid as a regulator | | | | | | |
| 16 | 125 | 27 | 59 | 190[1] | 60 | b | 30 | 0.01 | 267 | 2100 |
| | | | | | without regulator | | | | | |
| 17 | 125 | 27 | 59 | 190[1] | 60 | a | 55 | 0.10 | 238 | 790 |
| 18 | 125 | 27 | 59 | 190[2] | 60 | a | 55 | 0.05 | 245 | 900 |
| 19 | 125 | 27 | 59 | 170[2] | 60 | a | 55 | 0.05 | 245 | 900 |
| 20 | 90 | 34 | 76 | 190[1] | 60 | a | 55 | 0.04 | 247 | 720 |
| Comparative Example | | | | | Emulsifier B | | | | | |
| 7 | 125 | 27 | 59 | 190[1] | 60 | a | 55 | [3] | n.d. | n.d. |
| 8 | 125 | 27 | 59 | 190[1] | 80 | a | 55 | 10.3 | n.d. | n.d. |
| | | | | | Emulsifier C | | | | | |

TABLE 2-continued

| | $M_1$ [g] | $M_2$ [g] | NaOH [g] | Oil [g] | Emulsifier [g] | Initiator | T [°C.] | Coagulum [%] | K value | Viscosity [mPa·s] |
|---|---|---|---|---|---|---|---|---|---|---|
| 9 | 125 | 27 | 59 | 190[1] | 80 | a | 55 | [3] | n.d. | n.d. |

$M_1$: 50% strength aqueous acrylamide solution
$M_2$: 80% strength aqueous dimethylaminoethyl acrylate methochloride solution
T: Polymerization temperature
a: Dimethyl 2,2'-azobisisobutyrate
b: 2,2'-Azobis-(4-methoxy-2,4-dimethylvaleronitrile)
[1] Rapeseed oil (fully refined product)
[2] Sunflower oil (fully refined product)
[3]: Non-filterable (specky)
n.d.: not determinable

EXAMPLE 21

Example 1 was repeated, except that 360 g of 50% strength aqueous 3-methacrylamidopropyltrimethylammonium chloride solution, 260 g of rapeseed oil (fully refined product) and 90 g of emulsifier A were used. The resulting water-in-oil polymer emulsion had a viscosity of 730 mPa.s. The K value of the polymer was 148. 0.01% of coagulum was filtered off.

EXAMPLE 22

Example 15 was repeated, except that 188 g of 50% strength aqueous acrylamide solution, 115 g of 2-acrylamido-2-methylpropanesulfonic acid, 0.2 g of 40% strength aqueous sodium diethylenetriaminepentaacetate solution, 85 g of 25% strength aqueous sodium hydroxide solution, 255 g of rapeseed oil (fully refined product) and 90 g of emulsifier A were used. The resulting water-in-oil polymer emulsion had a viscosity of 2,700 mPa.s. The K value of the polymer was 143. 0.14% of coagulum was filtered off.

EXAMPLE 23

260 g of rapeseed oil,
45 g of emulsifier A and
10 g of emulsifier II/1
were initially taken as the oil phase in a 2 l flask provided with a stirrer, a thermometer and a gas inlet tube. Thereafter, a mixture of
280 g of 50% strength aqueous acrylamide solution,
96 g of 80% strength aqueous dimethylaminoethyl acrylate methochloride solution and
0.2 g of 40% strength aqueous sodium diethylenetriaminepentaacetate
was added as the aqueous phase (pH is brought to 4 by adding a few drops of 10% strength hydrochloric acid) stirring was carried out at a speed of 200 rpm while passing in nitrogen for 30 minutes at 25° C. 0.1 g of dimethyl 2,2'-azobisisobutyrate in 1 g of acetone was then added as an initiator, and the reaction mixture was heated to 55° C. During the polymerization, the bath temperature was controlled so that the temperature of the reaction mixture remained constant. The polymerization was complete after about 4 hours. The emulsion was then filtered through a perlon filter having a mesh size of 250 μm. The coagulum content (based on the total emulsion) was 0.59%. The water-in-oil polymer emulsion had a viscosity of 1850 mPas. The K value of the polymer was 194.

When 2 g of emulsion in 98 g of distilled water were added with rapid stirring with the magnetic stirrer, a virtually homogeneous, milky viscous solution was obtained after about 15 minutes.

The inversion process and the dissolution of the polymer could be accelerated when 0.4 g of the reaction product of myristyl alcohol with 7 mol of ethylene oxide and 4 mol of propylene oxide was stirred into 100 g of emulsion and this wetting agent-containing water-in-oil polymer emulsion was used in the above procedure. In this case, a virtually homogeneous, milky viscous solution was obtained after only about 8 minutes.

EXAMPLES 24 TO 27

Example 23 was repeated in each case with the changes shown in Table 3. The result obtained are likewise shown in Table 3.

TABLE 3

| | Rapeseed oil [g] | A [g] | II/1 [g] | II/2 [g] | II/3 [g] | Coagulum [%] | K value | Viscosity [mPas] |
|---|---|---|---|---|---|---|---|---|
| Example | | | | | | | | |
| 24 | 260 | 55 | 10 | — | — | 0.57 | 179 | 1770 |
| 25 | 295 | 45 | 10 | — | — | 0.25 | 186 | 1460 |
| 26 | 295 | 45 | — | 10 | — | 0.10 | 197 | 4800 |
| 27 | 295 | 45 | — | — | 10 | 0.16 | 217 | 1820 |
| Comp. example | | | | | | | | |
| 10 | 260 | 45 | — | — | — | n.d. | n.d. | n.d.[1] |
| 11 | 295 | 45 | — | — | — | n.d. | n.d. | n.d. |
| 12 | 260 | 55 | — | — | — | n.d. | n.d. | 29,000 | n.d.: not determinable, emulsion contains specks.
[1] creamy

EXAMPLE 28

220 g of rapeseed oil,
30 g of emulsifier A and
10 g of emulsifier II/1
were initially taken as the oil phase in a 2 l flask provided with a stirrer, thermometer and a gas inlet tube. For the preparation of the aqueous phase,
175 g of 50% strength aqueous acrylamide solution,
27 g of acrylic acid and
0.1 g of 40% strength aqueous sodium diethylenetriaminepentaacetate
were mixed, and 59 g of 25% aqueous sodium hydroxide solution were carefully added. The pH of the aqueous phase was then 7. The aqueous phase was then added to the oil phase, and stirring was carried out at a speed of 200 rpm while passing in nitrogen for 30 minutes at 25° C. 0.1 g of dimethyl 2,2'-azobisisobutyrate, dissolved in 1 g of acetone, was then added as an initiator, and the reaction mixture was heated to 55° C. The polymerization lasted for about 4 hours. The emulsion was then filtered through a perlon filter having a mesh size of 250 μm. The coagulum content was 0.008%, based on the total emulsion. The water-in-oil polymer emulsion had a viscosity of 350 mPas. The K value of the polymer was 205.

When 2 g of emulsion in 98 g of distilled water were added with rapid stirring with the magnetic stirrer, a virtually homogeneous, milky viscous solution was obtained after about 15 minutes.

This invertion process and the dissolution of the copolymer could be accelerated when 0.4 g of a reaction product of myristyl alcohol with 7 mol of ethylene oxide and 4 mol of propylene oxide was stirred into 100 g of emulsion and this wetting agent-containing water-in-oil polymer emulsion was used in the above procedure. A virtually homogeneous, milky viscous solution was then obtained after only about 8 minutes.

EXAMPLES 29 TO 31

Example 28 was repeated in each case with the changes shown in Table 4. The results obtained are likewise shown in Table 4.

TABLE 4

| | Rapeseed oil [g] | A [g] | II/3 [g] | II/4 [g] | Coagulum [%] | K value | Viscosity [mPas] |
| --- | --- | --- | --- | --- | --- | --- | --- |
| Example | | | | | | | |
| 29 | 220 | 30 | 10 | — | 0.026 | 249 | 670 |
| 30 | 150 | 30 | 10 | — | 0.02 | 265 | 2170 |
| 31 | 170 | 30 | — | 5 | 0.04 | 236 | 2300 |
| Comp. example | | | | | | | |
| 13 | 220 | 30 | — | — | n.d. | n.d. | n.d. |
| 14 | 170 | 30 | — | — | n.d. | n.d. | n.d. | n.d.: not determinable, emulsion contains specks.

EXAMPLE 32

220 g of rapeseed oil,
30 g of emulsifier A and
10 g of emulsifier II/1
were initially taken as the oil phase in a 2 l flask provided with a stirrer, thermometer and a gas inlet tube. For the preparation of the aqueous phase,
10 g of water,
70 g of acrylic acid and
0.05 g of 40% strength aqueous sodium diethylenetriaminepentaacetate
were mixed, and 152 g of 25% strength aqueous sodium hydroxide solution were carefully added. The aqueous phase was then added to the oil phase, and stirring was carried out at a speed of 200 rpm while passing in nitrogen for 30 minutes at 25° C. 0.1 g of dimethyl 2,2'azobisisobutyrate, dissolved in 1 g of acetone, was then added as an initiator, and the reaction mixture was heated to 55° C. The polymerization lasted for about 4 hours. The emulsion was then filtered through a perlon filter having a mesh size of 250 μm. The coagulum content was 0.2%, based on the total emulsion. The water-in-oil polymer emulsion had a viscosity of 550 mPas. The K value of the polymer was 156.

EXAMPLE 33

220 g of rapeseed oil,
30 g of emulsifier A and
10 g of emulsifier II/1
were initially taken as the oil phase in a 2 l flask provided with a stirrer, a thermometer and a gas inlet tube. For the preparation of the aqueous phase,
20.2 g of 50% strength aqueous acrylamide solution,
70 g of acrylic acid,
15 mg of N,N'-methylenebisacrylamide and
0.05 g of 40% strength aqueous sodium diethylenetriaminepentaacetate
were mixed, and 150 g of 25% strength aqueous sodium hydroxide solution were carefully added. The pH of the aqueous phase was then 7. The aqueous phase was then added to the oil phase, and stirring was carried out at a speed of 200 rpm while passing in nitrogen for 30 minutes at 25° C. 0.1 g of dimethyl 2,2'-azobisisobutyrate, dissolved in 1 g of acetone, was then added as an initiator, and the reaction mixture was heated to 55° C. The polymerization lasted for about 4 hours. The emulsion was then filtered through a perlon filter having a mesh size of 250 μm. The coagulum content was 0.4%, based on the total emulsion. The water-in-oil polymer emulsion had a viscosity of 1440 mPas.

EXAMPLE 34

300 g of rapeseed oil,
60 g of emulsifier A and
20 g of emulsifier II/3
were initially taken as the oil phase in a 2 l flask provided with a stirrer, a thermometer and a gas inlet tube. For the preparation of the aqueous phase,
380 g of 50% strength aqueous acrylamide solution and
0.1 g of 40% strength aqueous sodium diethylenetriaminepentaacetate
were mixed. The aqueous phase was added to the oil phase, and stirring was carried out a speed of 200 rpm while passing in nitrogen for 30 minutes at 25° C. 0.1 g of dimethyl 2,2'-azobisisobutyrate, dissolved in 1 g of acetone, was then added as an initiator, and the reaction mixture was heated to 55° C. The polymerization lasted for about 4 hours. The emulsion was then filtered through a perlon filter having a mesh size of 250 μm. The coagulum content was 0.33%, based on the total emulsion. The water-in-oil polymer emulsion had a viscosity of 2650 mPas. The K value of the polymer was 226.

We claim:
1. A water-in-oil polymer emulsion which contains a water-soluble or water-swellable polymer finely distributed in a continuous, water-immiscible organic phase, a water-in-oil emulsifier and, optionally, a wetting agent, wherein the continuous organic phase consists of an oil of vegetable or animal origin and contains, as a water-in-oil emulsifier, a compound which is obtainable by
- (A) reacting a $C_{10}$–$C_{22}$-fatty alcohol with epichlorohydrin in a molar ratio of from 1:0.5 to 1:1.5 to give a glycidyl ether,
- (B) reacting the glycidyl ether with (1) a saturated $C_2$–$C_6$-alcohol containing from 2 to 6 OH groups or (2) the monoether thereof with a $C_{10}$–$C_{22}$-fatty alcohol, in a molar ratio of glycidyl ether to (1) or (2) of from 1:0.5 to 1:6, in the presence of an acid or base and
- (C) alkoxylating the reaction product from (B) with one or more $C_2$–$C_4$ alkylene oxides in a molar ratio of from 1:1 to 1:6, optionally, from 5 to 95% by weight of the stated water-in-soil emulsifier being replaced with other water-in-oil emulsifiers.

2. A process for the preparation of a water-in-oil polymer emulsion as claimed in claim 1, wherein water-soluble monoethylenically unsaturated monomers, alone or together with crosslinking agents or, optionally, water-insoluble monoethylenically unsaturated monomers, are emulsified with water-in-oil emulsifier which is obtainable by
- (A) reacting a $C_{10}$–$C_{22}$-fatty alcohol with epichlorohydrin in a molar ratio of from 1:0.5 to 1:1.5 to give a glycidyl ether,
- (B) reacting the glycidyl ether with (1) a saturated $C_2$–$C_6$-alcohol containing from 2 to 6 OH groups or (2) the monoether thereof with a $C_{10}$–$C_{22}$-fatty alcohol, in a molar ratio of glycidyl ether to (1) or (2) of from 1:0.5 to 1:6, in the presence of an acid or base and
- (C) alkoxylating the reaction product from (B) with one or more $C_2$–$C_4$-alkylene oxides in a molar ratio of from 1:1 to 1:6, optionally, from 5 to 95% by weight of the stated water-in-soil emulsifier being replaced with other water-in-oil emulsifiers, in an organic phase which consists of an oil of vegetable or animal origin, and the monomers of the emulsion are polymerized in the presence of initiators and, if required, wetting agents.

* * * * *